US012693736B2

(12) United States Patent
Ninan

(10) Patent No.: US 12,693,736 B2
(45) Date of Patent: Jul. 28, 2026

(54) AUGMENTED REALITY AND SCREEN IMAGE RENDERING COORDINATION

(71) Applicant: Dolby Laboratories Licensing Corporation, San Francisco, CA (US)

(72) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 150 days.

(21) Appl. No.: 18/693,504

(22) PCT Filed: Sep. 22, 2022

(86) PCT No.: PCT/US2022/044442
§ 371 (c)(1),
(2) Date: Mar. 19, 2024

(87) PCT Pub. No.: WO2023/049293
PCT Pub. Date: Mar. 30, 2023

(65) Prior Publication Data
US 2024/0272712 A1 Aug. 15, 2024

Related U.S. Application Data

(60) Provisional application No. 63/248,011, filed on Sep. 24, 2021.

(30) Foreign Application Priority Data

Sep. 24, 2021 (EP) ..................................... 21198907

(51) Int. Cl.
*G06V 20/20* (2022.01)
*G06F 3/01* (2006.01)
(Continued)

(52) U.S. Cl.
CPC .............. *G06F 3/013* (2013.01); *G06T 15/20* (2013.01); *G06T 19/00* (2013.01); *G06V 10/44* (2022.01); *G06V 20/20* (2022.01)

(58) Field of Classification Search
CPC .......... G06F 3/013; G06F 3/012; G06F 3/011; G06T 15/20; G06T 19/00; G06V 10/44; G06V 20/20
See application file for complete search history.

(56) References Cited

U.S. PATENT DOCUMENTS 9,875,573 B2 1/2018 Siddique
10,078,917 B1 9/2018 Gaeta
(Continued)

OTHER PUBLICATIONS

Benko et al., "FoveAR Combining an Optically See-Through Near-Eye Display with Projector-Based Spatial Augmented Reality", User Interface Software and Technology, ACM, 2 Penn Plaza, Suite 701 New York NY 10121-0701 USA, Nov. 5, 2015 (Nov. 5, 2015), pp. 129-135, XP058525302, 7 pages.
(Continued)

*Primary Examiner* — Jitesh Patel

(57) ABSTRACT

A first image for rendering on a first image display in a combination of a stationary image display and a non-stationary image display is received. A visual object depicted in the first image is identified. A corresponding image portion in a second image is generated for rendering on a second image display in the combination of the stationary image display and the non-stationary image display. The corresponding image portion in the second image as rendered on the second image display overlaps in a vision field of a viewer with the visual object depicted in the second image as rendered on the first image display to modify one or more visual characteristics of the visual object. The second image is caused to be rendered on the second image (Continued)

concurrently while the first image is being rendered on the second image display.

13 Claims, 10 Drawing Sheets

(51) Int. Cl.

| | | |
|---|---|---|
| *G06T 15/20* | (2011.01) | |
| *G06T 19/00* | (2011.01) | |
| *G06V 10/44* | (2022.01) | |

(56) References Cited

U.S. PATENT DOCUMENTS

| | | | | |
|---|---|---|---|---|
| 10,665,036 | B1 * | 5/2020 | Ha | G02B 27/017 |
| 10,726,574 | B2 | 7/2020 | Ninan | |
| 10,937,242 | B2 | 3/2021 | Chapman | |
| 10,991,164 | B2 | 4/2021 | Ninan | |
| 11,132,838 | B2 | 9/2021 | Cordes | |
| 11,330,309 | B2 | 5/2022 | Ninan | |
| 11,445,299 | B2 | 9/2022 | Davis | |
| 2012/0127284 | A1 | 5/2012 | Bar-Zeev | |
| 2017/0052373 | A1 * | 2/2017 | Memmott | G06F 3/04845 |
| 2017/0177197 | A1 * | 6/2017 | Waggoner | G06F 3/167 |
| 2019/0259189 | A1 | 8/2019 | John | |
| 2020/0379560 | A1 * | 12/2020 | Krasadakis | G06V 40/193 |
| 2021/0043007 | A1 | 2/2021 | Jones | |
| 2021/0065436 | A1 | 3/2021 | Oriol | |
| 2021/0118231 | A1 | 4/2021 | Hutten | |
| 2021/0120317 | A1 | 4/2021 | Defaria | |
| 2021/0134061 | A1 | 5/2021 | Timonen | |
| 2021/0142582 | A1 | 5/2021 | Jones | |
| 2021/0160441 | A1 | 5/2021 | Bleyer | |
| 2022/0121275 | A1 * | 4/2022 | Balaji | G06V 20/20 |
| 2023/0305310 | A1 | 9/2023 | Ninan | |

OTHER PUBLICATIONS

Konrad et al., "Gaze-Contingent Ocular Parallax Rendering for Virtual Reality" ACM Transactions on Graphics, vol. 39, Issue 2, Apr. 2020 https://doi.org/10.1145/3361330, 12 pages.

Lindlbauer et al., "Combining Shape-Changing Interfaces and Spatial Augmented Reality Enables Extended Object Appearance" CHI '16: Proceedings of the 2016 CHI Conference on Human Factors in Computing Systems, May 2016, https://doi.org/10.1145/2858036.2858457, 12 pages.

Wetzstein Gordon et al: "State of the Art in Perceptual VR Displays", Mar. 3, 2020 (Mar. 3, 2020), Computer Vision—ECCV 2020 : 16th European Conference, Glasgow, UK, Aug. 23-28, 2020 : Proceedings; Part of the Lecture Notes in Computer Science ; ISSN 0302-9743; [Lecture Notes in Computer Science; Lect.Notes Computer], Springer International PU, XP047545507, 23 pages.

* cited by examiner

402 — RECEIVE A FIRST IMAGE FOR RENDERING ON A FIRST IMAGE DISPLAY

404 — IDENTIFY A VISUAL OBJECT DEPICTED IN THE FIRST IMAGE

406 — GENERATE A CORRESPONDING IMAGE PORTION IN A SECOND IMAGE FOR RENDERING ON A SECOND IMAGE DISPLAY

408 — CAUSE THE SECOND IMAGE TO BE RENDERED ON THE SECOND IMAGE CONCURRENTLY WHILE THE FIRST IMAGE IS BEING RENDERED ON THE SECOND IMAGE DISPLAY

AUGMENTED REALITY AND SCREEN IMAGE RENDERING COORDINATION

CROSS REFERENCE TO RELATED APPLICATIONS

The present application is a U.S. National Stage application under U.S.C. 371 of International Application No. PCT/US2022/044442, filed on Sep. 22, 2022, which claims the benefit of priority from European Patent Application No. 21198907.4, filed on Sep. 24, 2021 and U.S. Provisional Patent Application No. 63/248,011, filed on Sep. 24, 2021, each one incorporated herein by reference in its entirety.

TECHNOLOGY

The present invention relates generally to video images, and in particular, to augmented reality and screen image rendering coordination.

BACKGROUND

A user device such as wearable or handheld devices may be used in a wide variety of video or media consumption applications including but not limited to virtual reality (VR) and augmented reality (AR), mixed reality (MR), telepresence, telemedicine, 3D video, omnidirectional video, and so on. To add dynamism and interaction into viewer experience, such an application can monitor time varying spatial positions and directions of the user device from physical movements, and render imagery based on the spatial positions and directions of the user device.

However, visual objects rendered by the user device and other objects not rendered by the user device may be readily discernible by the user as belonging to two very different worlds. For example, in scenarios in which the user device is an AR device that allows the user to view both AR objects rendered by the user device and to see through (e.g., 3D glasses, etc.) other non-AR objects rendered by a screen image display, the AR objects may appear as artificial floating visual objects or information blocks that do not belong to the same physical world as, and may even unintentionally obstruct and interfere with, the other non-AR objects to be seen by the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

US 2021/120317 A1 discloses a method for geometric matching of virtual reality (VR) or augmented reality (AR) output contemporaneously with video output formatted for display on a 2D screen including a determination of value sets that when used in image processing cause an off-screen angular field of view of the at least one of the AR output object or the VR output object to have a fixed relationship to at least one of the angular field of view of the onscreen object or of the 2D screen. The AR/VR output object is outputted to an AR/VR display device and the user experience is improved by the geometric matching between objects observed on the AR/VR display device and corresponding objects appearing on the 2D screen.

U.S. Pat. No. 10,078,917 B1 discloses a method that includes rendering a first view of a three-dimensional (3-D) virtual scene comprising a view of first content being displayed on a virtual display device from a location in the 3-D virtual scene. The method may also include rendering a second view comprising one or more content objects. The second view may be rendered from the location in the 3-D virtual scene, and the second scene may include a view of the display device as would be seen through a pair of augmented-reality glasses that display the one or more content objects. The method may additionally include generating a composite view by combing the first view and the second view. The method may further include causing the composite view to be displayed on a virtual-reality headset.

Benko Hrvoje et al.: "FoveAR Combining an Optically See-Through Near-Eye Display with Projector-Based Spatial Augmented Reality", User Interface Software and Technology, ACM, 5 Nov. 2015, pages 129-135, XP 058525302, discloses optically see-through (OST) augmented reality glasses overlaying spatially-registered computer-generated content onto the real world. Optical designs and weight considerations known in the prior art limit their diagonal field of view to less than 40 degrees, making it difficult to create a sense of immersion or give the viewer an overview of the augmented reality space. OST glasses are combined with a projection-based spatial augmented reality display to achieve a novel display hybrid, called FoveAR, capable of greater than 100 degrees field of view, view dependent graphics, extended brightness and color, as well as interesting combinations of public and personal data display.

SUMMARY OF THE DISCLOSURE

The invention is defined by the independent claims. The dependent claims concern optional features of some embodiments of the invention.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
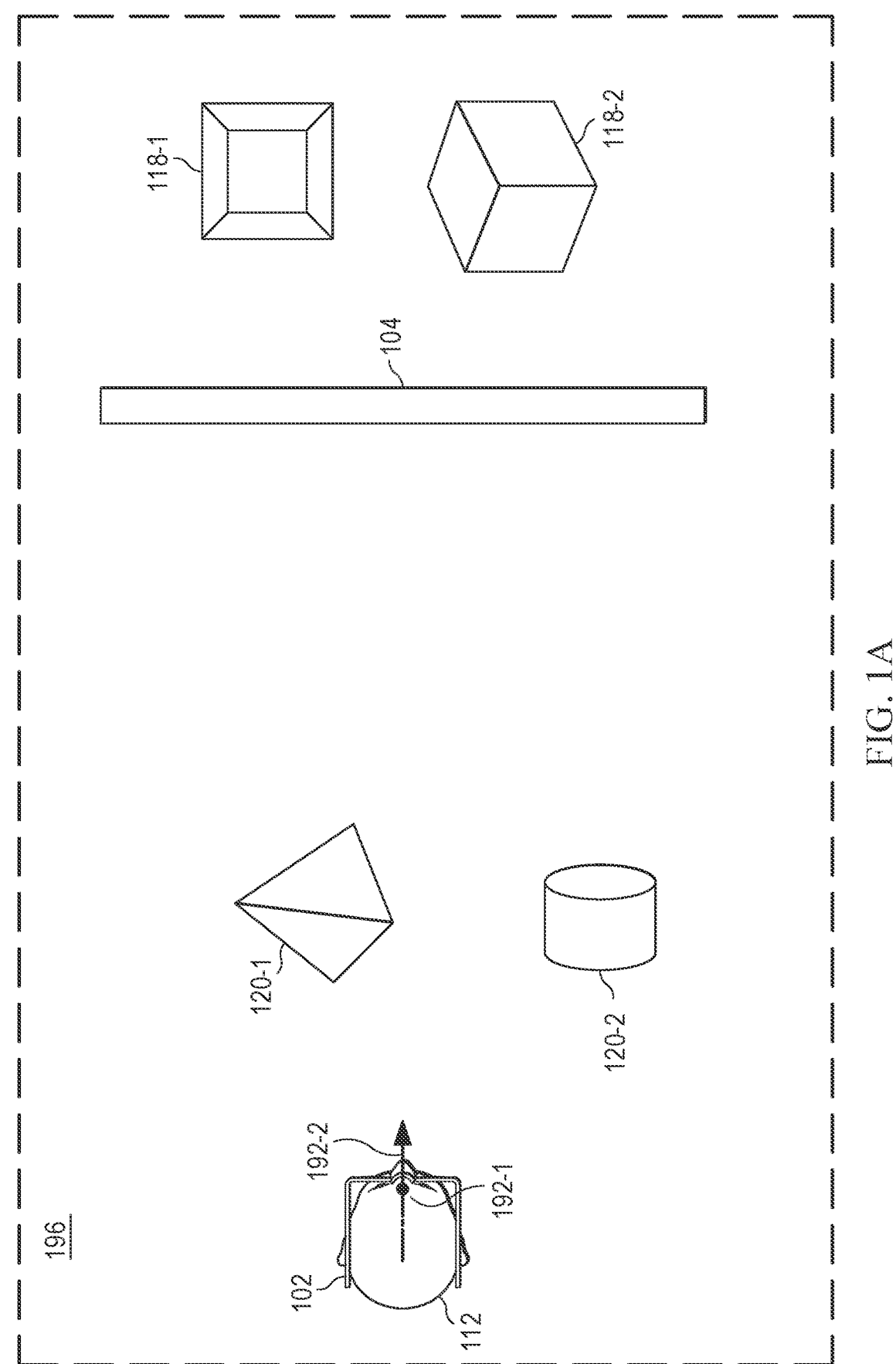
FIG. 1A and FIG. 1B illustrate example 3D objects rendered collectively and concurrently by AR and screen image displays.

Example embodiments, which relate to augmented reality and screen image rendering coordination, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unneces-sarily occluding, obscuring, or obfuscating the present invention.

Example embodiments are described herein according to the following outline:

1. GENERAL OVERVIEW
2. AUGMENTED REALITY AND SCREEN IMAGE DISPLAYS
3. PERSPECTIVE CORRECTION
4. COMPENSATED IMAGE RENDERING
5. DYNAMIC IMAGE RENDERING TRANSITION BETWEEN IMAGE DISPLAYS
6. SUPPLEMENTAL INFORMATION DISPLAY
7. EXAMPLE IMAGE RENDERING SYSTEM
8. EXAMPLE PROCESS FLOWS
9. IMPLEMENTATION MECHANISMS—HARD-WARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be com-bined to form further embodiments.

Example embodiments described herein relate to com-pensated image rendering between or among different image displays. A first image for rendering on a first image display in a combination of a stationary image display and a non-stationary image display is received. A visual object depicted in the first image is identified. A corresponding image portion in a second image is generated for rendering on a second image display in the combination of the sta-tionary image display and the non-stationary image display. The corresponding image portion in the second image as rendered on the second image display overlaps in a vision field of a viewer with the visual object depicted in the second image as rendered on the first image display to modify one or more visual characteristics of the visual object. The second image is caused to be rendered on the second image concurrently while the first image is being rendered on the second image display.

Example embodiments described herein relate to multi-display systems implementing compensated image render-ing. A display system comprises: a non-stationary image display that renders non-screen display images: a stationary image display that renders screen display images: an image rendering controller that controls the non-stationary image display and the stationary image display to perform com-pensated image rendering as described herein. Additionally, optionally or alternatively, the display system controls one or both of the non-stationary image display or the stationary image display to perform perspective correction with respect to rendered images.

In some example embodiments, mechanisms as described herein form a part of a media processing system, including but not limited to any of: AR device, VR device, MR device, cloud-based server, mobile device, virtual reality system, augmented reality system, head up display device, helmet mounted display device, CAVE-type system, wall-sized display, video game device, display device, media player, media server, media production system, camera systems, home-based systems, communication devices, video pro-cessing system, video codec system, studio system, stream-ing server, cloud-based content service system, a handheld device, game machine, television, cinema display, laptop computer, netbook computer, tablet computer, cellular radio-telephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclo-sure is not intended to be limited to the embodiments shown, but is to be accorded the widest scope consistent with the principles and features described herein.

2. Augmented Reality and Screen Image Displays

FIG. 1A illustrates example 3D (visual) objects (e.g., 120-1, 120-2, 118-1, 118-2, etc.) that are rendered collec-tively and concurrently with a user coupled (e.g., user attached, user movable, user operated, user mounted, head-mounted, wearable, etc.) image display device 102 and a user detached image display 104 to a viewer (or user) 112.

The user coupled image display device (102) may be a wearable device such as a head-mounted device or a hand-held device such as a mobile phone or a tablet device. The user coupled image display device (102) is physically coupled or attached to the viewer (112).

The user device (102) may be referred to herein as an augmented reality (AR) image display for simplicity. How-ever, it should be noted that, in various embodiments, the user device (102) may be any image display device physi-cally coupled or attached (e.g., handheld, mounted, fastened, etc.) with the viewer (112) through handholding, wearing, head mounting, etc. It should be further noted that, in various embodiments, the user device (102) may be used in VR, MR or other interactive or non-interactive image/video display applications.

The user detached image display (104) may be a computer screen, a television display, a home installed image display, a cinema, an image display in a venue such as a store, a park, a bar, an office, etc. The user detached image display device (104) may be referred to as a screen image display for simplicity. However, it should be noted that, in various embodiments, the user detached image display device (104) may be any image display device not physically attached (or mounted) with the viewer (112). It should be further noted that, in various embodiments, the user detached image display device (104) may be used in VR, MR or other interactive or non-interactive image/video display applica-tions, along with the AR image display (102).

While the screen image display (104) may be stationary in a physical 3D space 196 in which the viewer (112) is located, the AR image display (102) may move (e.g., translate, rotate, etc.) in the physical 3D space (196) from time to time caused by the viewer's physical actions or movements. In some operational scenarios, the movement and/or spatial position 192-1 and/or spatial orientation 192-2 of the AR image display (102) in the physical 3D space (196) are tracked by one or more tracking devices. As a result of device tracking, the movement and/or spatial position 192-1 and/or spatial orientation 192-2 of the AR image display (102) in the physical 3D space (196) are estimated, predicted or otherwise determined at any given time such as a time point at which the 3D objects (e.g., 120-1, 120-2, 118-1, 118-2, etc.) are being rendered by the AR image display (102) and the screen image display (104).

Example device tracking can be found in U.S. Provisional Patent Application No. 62/484,131, with an application title of "PASSIVE MULTI-WEARABLE-DEVICES TRACKING" by Ajit Ninan and Neil Mammen, filed on 11 Apr. 2017, the entire contents of which are hereby incorporated by reference as if fully set forth herein.

Figure 1B:
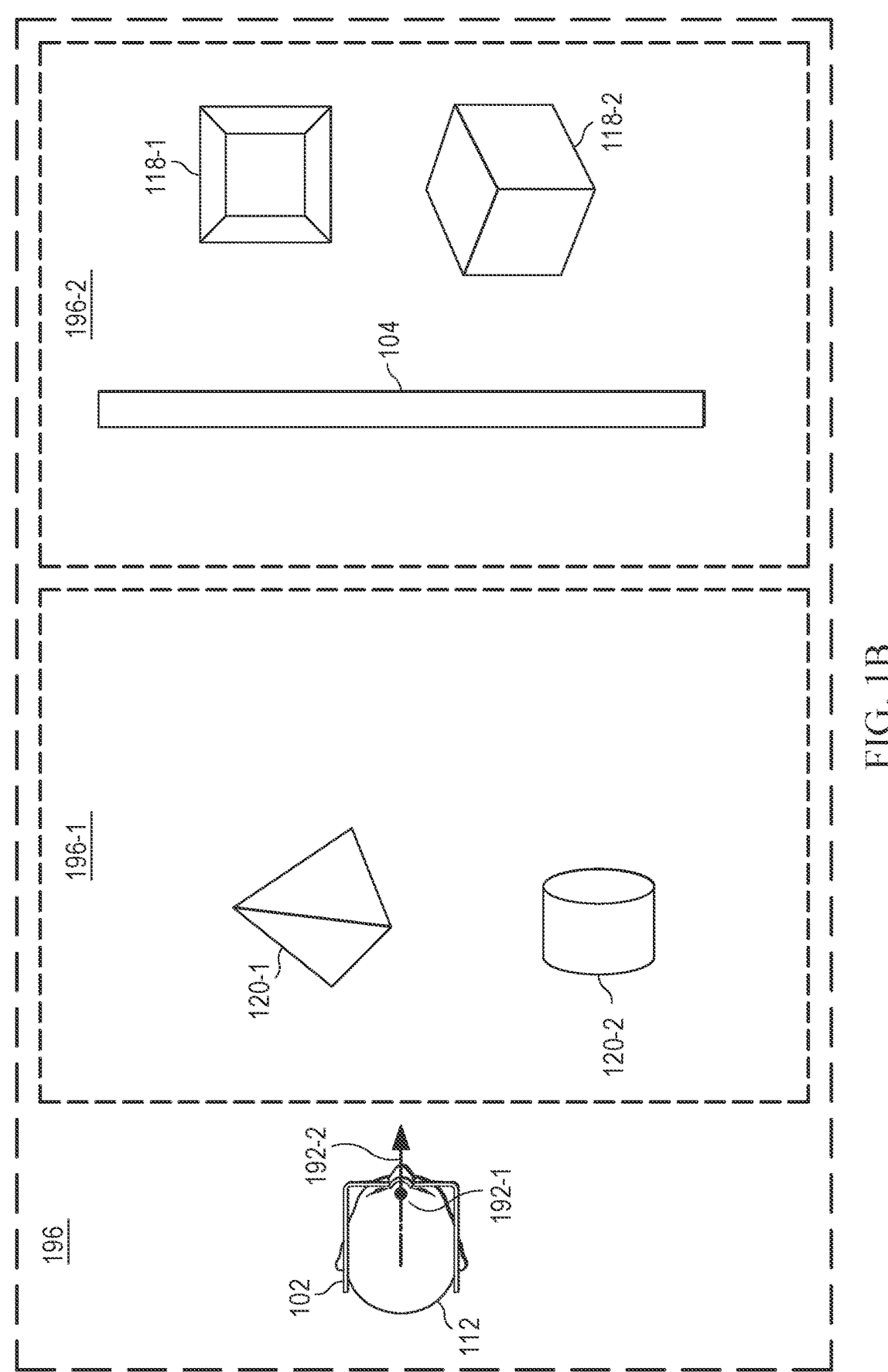

FIG. 1B illustrates example image spaces in which the 3D objects (e.g., 120-1, 120-2, 118-1, 118-2, etc.) are rendered by the AR image display (102) and the screen image display (104). The rendered 3D objects (e.g., 120-1, 120-2, 118-1, 118-2, etc.) reside or are depicted in an overall image spaces that includes a first image space 196-1 and a second image space 196-2. The first image space (196-1) may be simply referred to as an AR image space, whereas the second image space (196-2) may be simply referred to as a screen image space. The AR image space may be additionally, alternatively or optionally referred to as VR image space, MR image space, etc., depending on what specific display application the image displays (102 and 104) as described herein supports.

As shown in FIG. 1B, the 3D objects (120-1 and 120-2) are rendered by the AR image display (102) in the AR image space (196-1), whereas the 3D objects (118-1 and 118-2) are rendered by the screen image display (104) in the screen image space (196-2).

The screen image display (104) may render a time sequence of (consecutive) screen images depicting 2D or 3D objects at a sequence of (consecutive) time points, using image rendering techniques including, but not necessarily limited to only, one of: time-multiplexed 3D, space-multiplexed 3D, spectral-multiplexed 3D, Dolby 3D, RealD, linear polarization based 3D, circular polarization based 3D, spectral spatial separation based 3D, etc.

In some operational scenarios, the viewer (112) may see or visually perceive 3D objects rendered in the screen image space (196-2) using 3D glasses or another 3D viewing method. The 3D glasses may or may not be integrated with a single end user device that includes the AR image display (102).

In some operational scenarios, the screen image display (104) is a single user image display used by a single viewer (or user) to view rendered images on the screen image display (104). Additionally, optionally or alternatively, in some operational scenarios, the screen image display (104) is a shared image display used by one or more viewers (or users) concurrently to view rendered images on the screen image display (104).

The AR image display (102) may render a time sequence of (consecutive) AR images depicting 2D or 3D objects at the sequence of (consecutive) time points, using image rendering techniques including, but not necessarily limited to only, one of: an AR display, a HoloLens display, a Magic Leap display, a Mixed Reality (MR) display, a tensor display, a volumetric display, a light field (LF) display, an Immy display, a Meta display, a relatively simple pair of AR glasses, etc.

In some operational scenarios, 3D objects—or a subset of 3D objects thereof—in the AR image space (196-1) may be rendered with an image display of an AR, MR, VR or wearable device such as a headmounted device. Additionally, optionally or alternatively, in some operational scenarios, 3D objects—or a subset of 3D objects thereof—in the AR image space (196-1) may be rendered with an image display of a handheld user device such as a mobile phone or a tablet computing device. The viewer (112) may see or visually perceive rendered 3D images in the AR image space (196-1) using 3D glasses or another 3D image viewing method. Example AR, MR. VR or wearable devices can be found in U.S. Provisional Patent Application No. 62/484, 157, with an application title of "AUGMENTED 3D ENTERTAINMENT SYSTEMS" by Ajit Ninan and Neil Mammen, filed on 11 Apr. 2017: U.S. Provisional Patent Application No. 63/060,783, with an application title of "SYSTEM FOR OPTIMIZED SELECTIVE LIGHT PASS THROUGH" by Ajit Ninan, Titus Devine and Chun Chi Wan, filed on 4 Aug. 2020, the entire contents of which are hereby incorporated by reference as if fully set forth herein.

The sequence of screen images and the sequence of AR images may be generated or partitioned from a sequence of overall 3D images that cover a time interval or duration such as a user session represented by the plurality of time points. Example image generation and partitioning can be found in U.S. Provisional Patent Application No. 62/484,121, with an application title of "LAYERED AUGMENTED ENTERTAINMENT EXPERIENCES" by Ajit Ninan, Neil Mammen and Tyrome Brown, filed on 11 Apr. 2017, the entire contents of which are hereby incorporated by reference as if fully set forth herein.

For example, the 3D objects (120-1 and 120-2) rendered by the AR image display (102) in the AR image space (196-1) may be represented in one or more AR images in the sequence of AR images, whereas the 3D objects (118-1 and 118-2) rendered by the screen image display (104) in the screen image space (196-2) may be represented in one or more corresponding screen images in the sequence of screen images. The one or more AR images and the one or more corresponding screen images may be respectively generated or partitioned from one or more overall 3D images in the sequence of overall 3D images.

The AR images can be used to provide the viewer (112) a differentiated or enhanced media consumption experience in single-viewer operational scenarios or in multiple-viewers operational scenarios.

2D or 3D screen images can be rendered or displayed on the screen image display (104) while 2D or 3D AR images can be rendered or displayed on the AR image display (102). The viewer (112) can simultaneously watch the screen images and see (or visually perceive) additional 3D objects or additional 3D depth information in the AR images rendered with the AR image display (102). Some of the additional 3D objects depicted in the AR images rendered with the AR image display (102) can appear to be popped out of the screen image display (104) in front of the viewer (112).

The viewer (112) can track any of these 3D objects as if such 3D object were actually present in the 3D physical space (196) in which the viewer (112) is located. As the viewer (112) moves around the 3D object, the viewer (112) can see previously occluded visual details of the 3D object around the 3D object with an added/augmented dimension or depth of realism. As the viewer (112) moves, some or all of the depicted objects in the rendered images may move with the viewer (112), albeit differently depending on spatial relationships such as depths, angles, distances, etc., between each of the objects and the viewer (112) and/o depending on a spatial trajectory formed by the movements of the viewer (112). Hence, through the combination of the AR images and the screen images, the viewer (112) can get a psychovisual feeling of the 3D object being floating around, by seeing different parallaxes to these objects in response to the head and/or body movements of the viewer (112).

3. Perspective Correction

In some operational scenarios, the screen images and/or AR images may be perspective corrected as the viewer (112) is making time-varying head or body movements that cause the AR image display (102) to change spatial positions and/or spatial orientations. Example perspective correction of 2D or 3D images or 2D or 3D objects depicted therein may include, but are not necessarily limited to only, one or more of: relative or global translations, relative or global rotations, relative or global size scaling (e.g., zooming in, zooming out, etc.), etc.

For example, the viewer (112) may be watching 3D objects depicted in (AR) images rendered on a phone (which represents the AR image display (102)) as well as other 3D objects depicted in screen images rendered on the screen image display (104). As the viewer (112) moves the phone, AR images rendered on the phone may be perspective corrected to make the AR image space (196-1) depicted (in part) on the phone and the screen image space (196-2) as one continuous (image) space between the phone and the screen image display (104). The viewer (112) may visually perceive the 3D objects visible on the phone as in the same overall image space as the other 3D objects depicted on the screen image display (104), even when the viewer (112) is moving the phone around to see different ones among the 3D objects that are to be depicted on the phone.

Additionally, optionally or alternatively, in some operational scenarios, the screen images and/or AR images may not be perspective corrected as the viewer (112) is making time-varying head or body movements that cause the AR image display (102) to change spatial positions and/or spatial orientations.

Figure 2A:
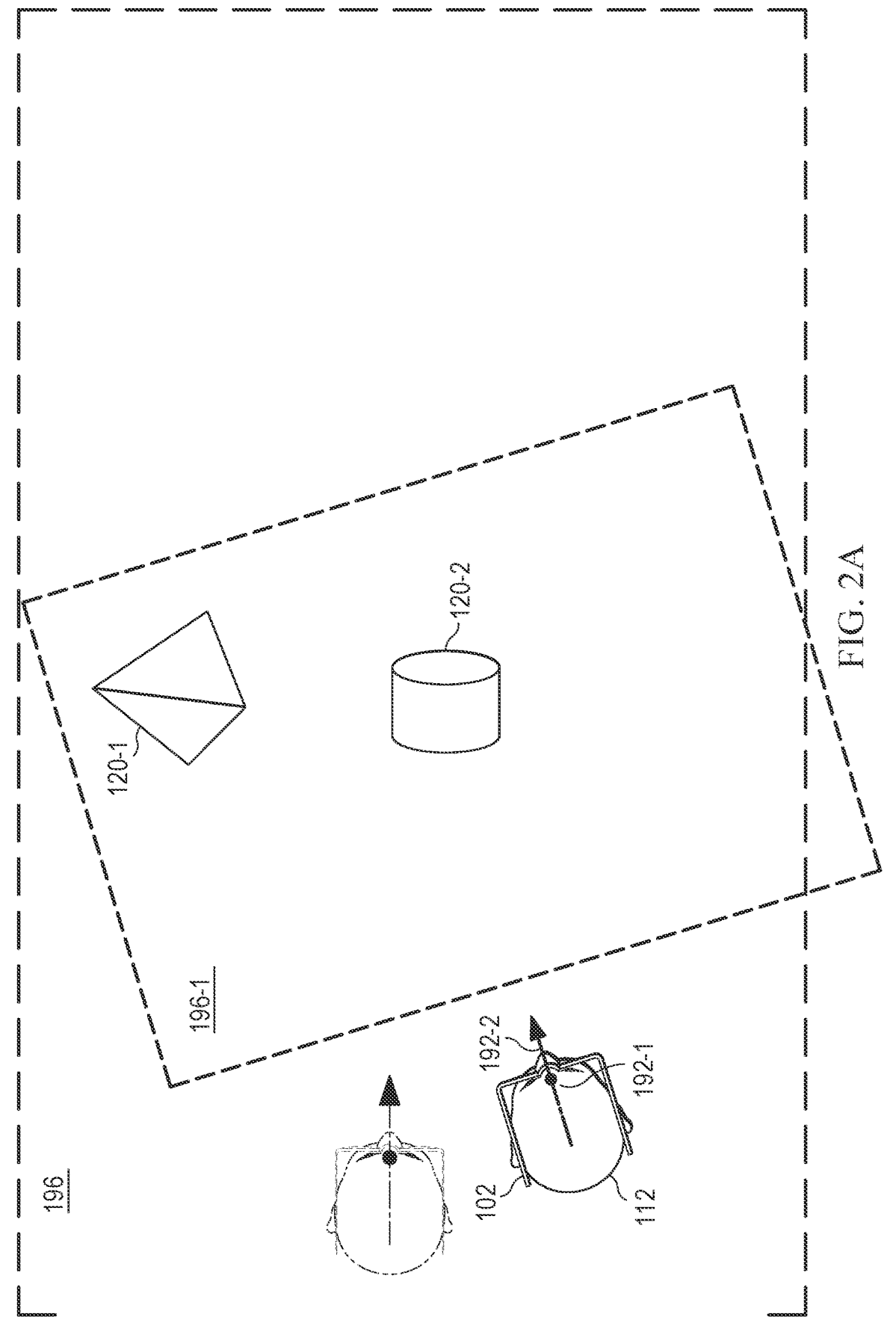
FIG. 2A and FIG. 2B illustrate example perspective correction of AR and screen images.

FIG. 2A illustrates example perspective correction of AR images. As shown, the spatial position (192-1) and/or the spatial direction (192-2) of the AR image display (102) may vary in the 3D space (196) from time to time as the viewer (112) makes head and/or body movements.

In response to detecting (e.g., in real time, in near real time, within a strict time budget, etc.) a change of the spatial position (192-1) and/or the spatial direction (192-2) of the AR image display (102), an image rendering controller (e.g., 110 of FIG. 1C, etc.) may generate one or more perspective corrected AR images respectively from one or more pre-perspective-corrected (e.g., original, non-perspective-corrected, etc.) AR images based on the change of the spatial position (192-1) and/or the spatial direction (192-2) of the AR image display (102). The pre-perspective-corrected AR images may be generated or partitioned from one or more corresponding overall 3D images to be viewed by the viewer (112) located at a reference spatial position and/or a reference spatial direction of the AR image display (102). The perspective-corrected AR images can be generated, adjusted and rendered by the AR image display (102) to enable the viewer (112) to view or visually examine/inspect these 3D objects from a different viewing perspective at the (currently changed) spatial position (192-1) and/or the (currently changed) spatial direction (192-2) of the AR image display (102).

For example, assuming that the 3D objects (120-1 and 120-2) rendered with the AR image display (102) have not been changed in reference to the 3D physical space (196) while the viewer (112) makes head and/or body movements, the perspective-corrected AR images can enable the viewer (112) to view or visually examine/inspect image details of these 3D objects visible to the different viewing perspective at the (currently changed) spatial position (192-1) and/or the (currently changed) spatial direction (192-2) of the AR image display (102).

Figure 2B:
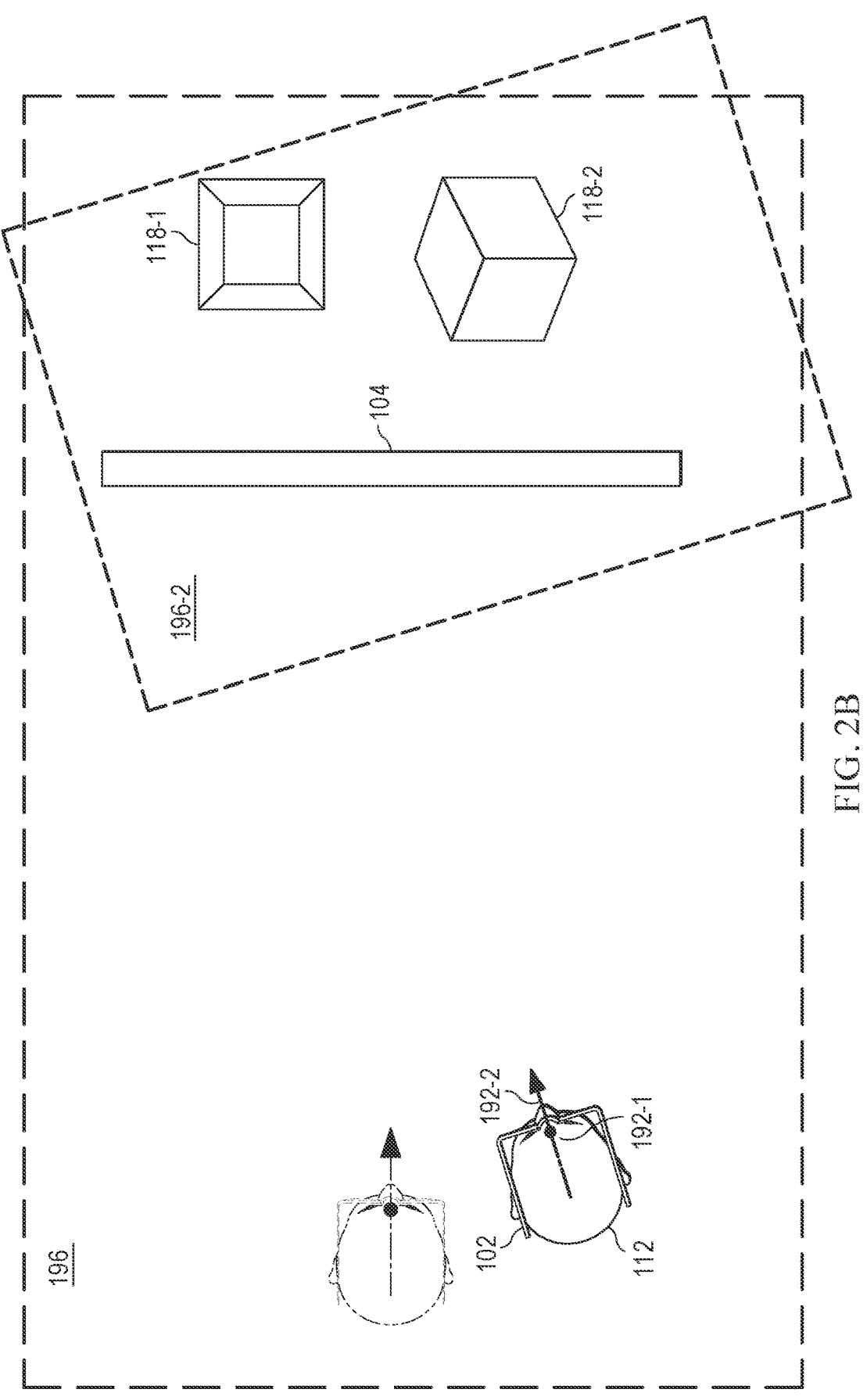

FIG. 2B illustrates example perspective correction of screen images. As shown, the spatial position (192-1) and/or the spatial direction (192-2) of 3D glasses—which may or may not be integrated in a single device with the AR image display (102)—may vary in the 3D space (196) from time to time as the viewer (112) makes the head and/or body movements.

In response to detecting (e.g., in real time, in near real time, within a strict time budget, etc.) a change of the spatial position (192-1) and/or the spatial direction (192-2) of the 3D glasses, the image rendering controller (e.g., 110 of FIG. 1C, etc.) may generate one or more perspective corrected screen images respectively from one or more pre-perspective-corrected (e.g., original, non-perspective-corrected, etc.) screen images based on the change of the spatial position (192-1) and/or the spatial direction (192-2) of the 3D glasses. The pre-perspective-corrected screen images may be generated or partitioned from the one or more corresponding overall 3D images to be viewed by the viewer (112) located at the reference spatial position and/or the reference spatial direction of the 3D glasses. The perspective-corrected screen images can be generated, adjusted and rendered by the screen image display (104) to enable the viewer (112) to view or visually examine/inspect these 3D objects from a different viewing perspective at the (currently changed) spatial position (192-1) and/or the (currently changed) spatial direction (192-2) of the 3D glasses.

For example, assuming that the 3D objects (118-1 and 118-2) have not been changed in reference to the 3D physical space (196) while the viewer (112) makes head and/or body movements, the perspective-corrected images can enable the viewer (112) to view or visually examine/inspect image details of these 3D objects visible to the different viewing perspective at the (currently changed) spatial position (192-1) and/or the (currently changed) spatial direction (192-2) of the 3D glasses.

In multiple-viewers operational scenarios, for example in a cinema, the same screen images may be rendered to multiple viewers. As the viewers make head or body movements that cause their AR image displays to change spatial positions and/or spatial orientations, no perspective correction may be performed with respect to the screen images rendered on the screen image display (104). For example, in these operational scenarios, the same pre-perspective-corrected (e.g., original, non-perspective-corrected, etc.) screen images may be rendered on the screen image display (104), while the spatial position (192-1) and/or the spatial direction (192-2) of 3D glasses vary in the 3D space (196) from time to time caused by the head and/or body movements of the viewer (112).

In these operational scenarios, as the viewer (112) makes the head or body movements that cause the AR image display (102) to change the spatial position (192-1) and/or spatial orientation (192-2), perspective correction may or may not be performed with respect to the AR images rendered on the AR image display (102).

In an example, as the viewer (112) makes the head or body movements that cause the AR image display (102) to change the spatial position (192-1) and/or spatial orientation (192-2), no perspective correction may be performed with respect to the AR images rendered on the AR image display (102). Hence, the same pre-perspective-corrected (e.g., original, non-perspective-corrected, etc.) AR images may be rendered on the AR image display (102), while the spatial position (192-1) and/or the spatial direction (192-2) of the AR image display (102) vary in the 3D space (196) from time to time caused by the head and/or body movements of the viewer (112).

In another example, as the viewer (112) makes the head or body movements that cause the AR image display (102) to change the spatial position (192-1) and/or spatial orientation (192-2), perspective correction is performed with respect to the AR images rendered on the AR image display (102). Hence, as illustrated in FIG. 2A, the perspective-corrected AR images may be rendered on the AR image display (102) in response to the change of the spatial position (192-1) and/or the spatial direction (192-2) of the AR image display (102) caused by the head and/or body movements of the viewer (112).

In single-viewer operational scenarios, the AR image display (102) has a one-to-one correspondence with the screen image display (104). As the viewer (112) makes head or body movements that cause the AR image display (102) to change the spatial position (192-1) and/or the spatial orientation (192-2), perspective correction may or may be performed with respect to either the AR images rendered on the AR image display (102) as illustrated in FIG. 2A or the screen images rendered on the screen image display (104) as illustrated in FIG. 2B or both of the AR images and the screen images.

In these operational scenarios, perspective correction may be performed with different references. In an example, perspective correction may be performed in reference to the 3D physical space (196)—e.g., both AR depicted objects and screen depicted objects may move as the viewer (112) moves. The perspective correction may depict the 3D objects as if they are real objects physically present in the 3D physical space (196). In another example, perspective correction may be performed in reference to the screen image space (196-2)—e.g., AR depicted objects may move as the viewer (112) moves while screen depicted objects may appear stationary. The AR images may be perspective corrected to the same perspective the viewer (112) is taking in viewing 3D objects in the (e.g., perspective adjusted, non-perspective-adjusted, etc.) screen images depicted in the screen image space (196-2). In yet another example, perspective correction may be performed in reference to the AR image space (196-1)—e.g., screen depicted objects may move as the viewer (112) moves while AR depicted objects may appear stationary. The screen images may be perspective corrected to the same perspective the viewer (112) is taking in viewing 3D objects in the (e.g., perspective adjusted, non-perspective-adjusted, etc.) AR images depicted in the AR image space (196-1).

Additionally, optionally or alternatively, neither AR images nor screen images are perspective corrected as the viewer (112) makes the head or body movements that cause the AR image display (102) and/or 3D glasses to change the spatial position (192-1) and/or spatial orientation (192-2).

For the purpose of illustration only, it has been described that the AR image display (102) through which the viewer (112) can view AR images or the 3D glasses through which the viewer (112) can view screen images can be spatially characterized or represented by the spatial position (192-1) and/or spatial orientation (192-2). It should be noted that, in various embodiments, different spatial representations of viewing perspectives relating to the AR images and/or the screen images may be used. For example, glass-free (e.g., autostereoscopic, etc.) 3D viewing may be supported under techniques described herein. The viewing perspective of the viewer (112) may be represented and tracked with the viewer's head or a logical face mesh instead of 3D glasses. In some embodiments, the 3D glasses used to view screen images may not be integrated into a single (e.g., wearable, headmounted, etc.) device with the AR image display (102)—e.g., the AR image display (102) is a handheld device. In these embodiments, the spatial position and/or the spatial direction of the 3D glasses and the spatial position and/or the spatial direction of the AR image display (102) may be separately and concurrently tracked and used in respective perspective correction (if performed) to the screen images and the AR images.

4 Compensated Image Rendering

AR and screen image displays can be controlled or coordinated, for example by an image rendering controller to perform compensated image rendering, which increase dynamic range, enlarge color gamut, increase color precision, enhance color saturation, setting forth (e.g., proper, specific, etc.) background for foreground objects, etc., in the combination of AR and screen images.

Figure 3A:
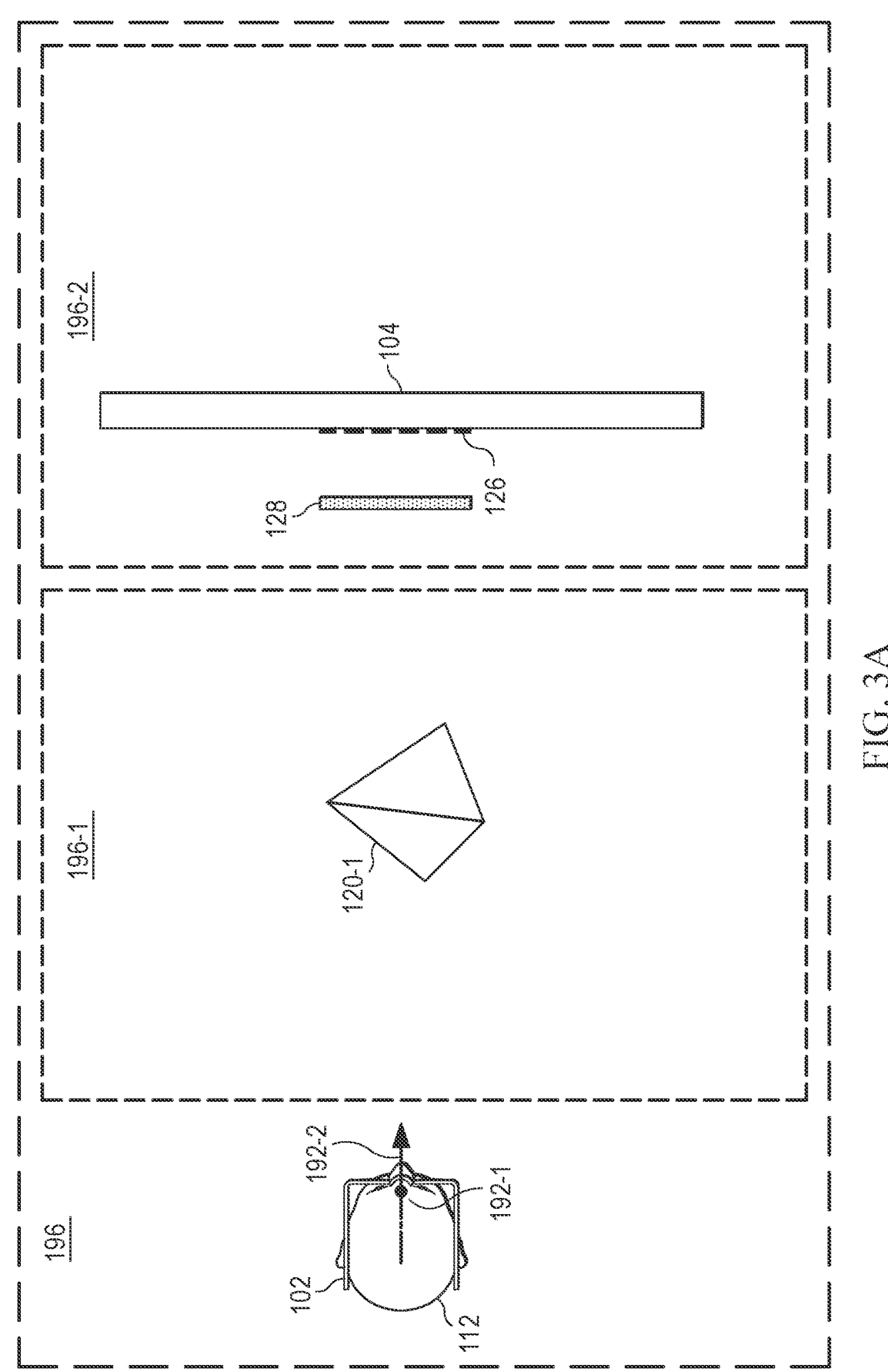
FIG. 3A through FIG. 3C illustrate example compensated image rendering operations by AR and screen image displays.

FIG. 3A illustrates example compensated image rendering to provide or set forth background for foreground objects rendered in an AR image. As shown, the object (120-1) may be depicted or rendered by the AR image display (102) as a foreground object.

Under other approaches that do not implement techniques as described herein, the AR image display (102) may render AR objects with a transparent or semi-transparent background. As a result, the viewer (112) may not be able to perceive this object (120-1) as a real or physically solid object.

An image rendering controller (e.g., 110 of FIG. 1C, etc.) as described herein can receive user tracking information from one or more tracking devices (e.g., 124 of FIG. 1C, etc.) indicating the spatial position (192-1) and/or the spatial direction (192-2) of the AR image display (102) and/or 3D glasses, geometric relationships between the viewer (112) and the screen image space (192), geometric relationship between the viewer (112) and the screen image display (104), etc. Example tracking devices as described herein may include, but are not necessarily limited to only, any of: external device trackers, internal device trackers, outside-in device trackers, inside-out device trackers, etc.

Additionally, optionally or alternatively, the image rendering controller (110) can access and/or use real-time or non-real-time AR and/or screen image display device configuration and/or operational information (e.g., maker, model, device operational settings, device operational statuses, etc.) to determine geometric relationships between the viewer (112) and each of the AR image space (196-1), geometric relationship between the viewer (112) and the AR image display (102), etc.

Figure 1C:
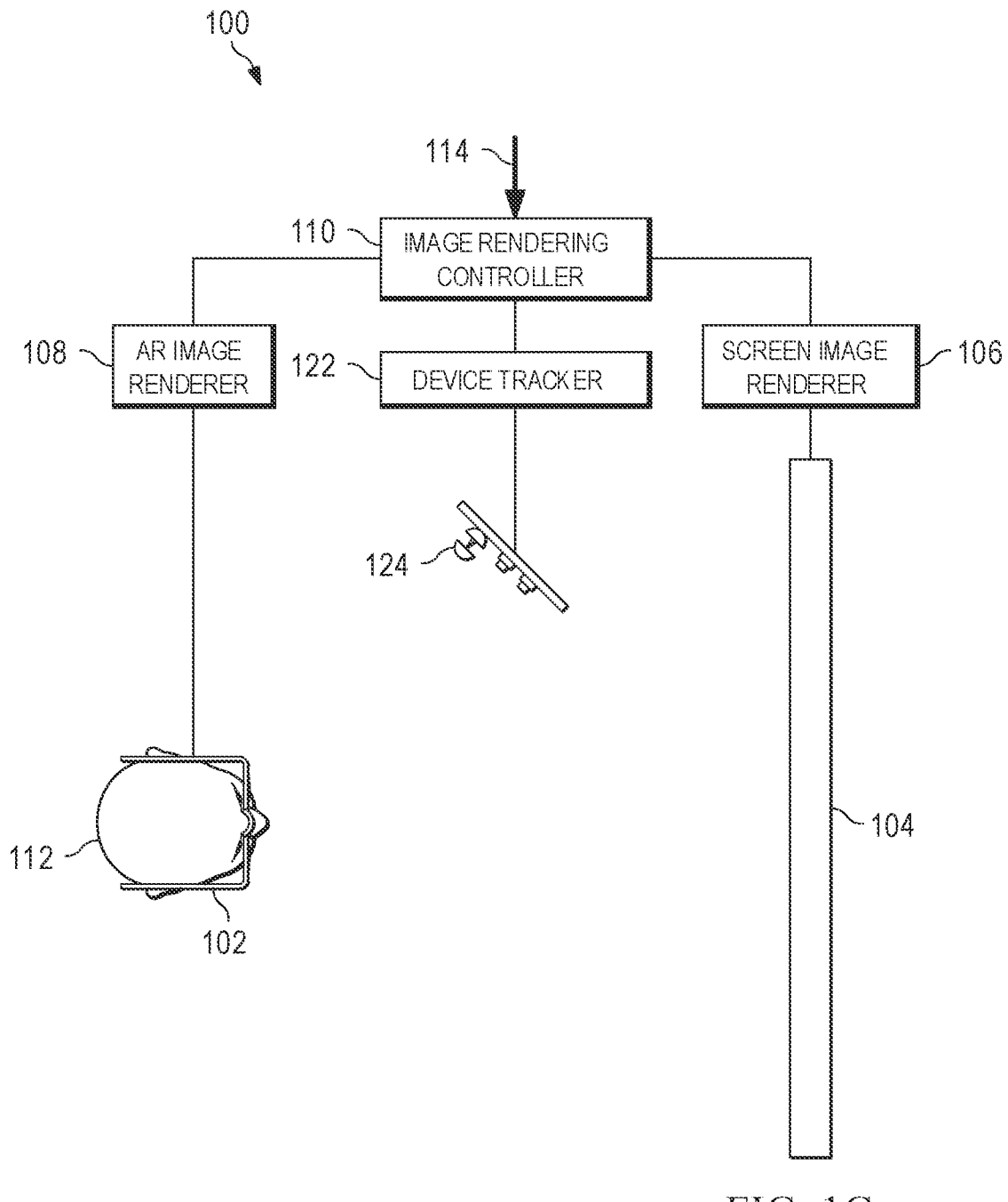
FIG. 1C illustrates an example media system including AR and screen image displays.

The image rendering controller (110) decodes, parses, or identifies geometric information of the object (120-1) rendered in the AR image based at least in part on image data and/or image metadata in a received image/video signal (e.g., 114 of FIG. 1C, etc.). In operational scenarios in which perspective correction is performed in AR and/or screen images, the geometric information (of the object (120-1))— as derived from the received image data and/or received image metadata—may be perspective corrected accordingly.

Using some or all of the geometric information collected from device tracking, device configuration and/or operational information, geometric information of depicted objects from the received image data and image metadata, the image rendering controller (110) can calculate or determine a portion 126 of a screen image (e.g., to be rendered concurrently with the AR image, etc.) corresponding to the AR image. The image rendering controller (110) can make or cause to make a change to the portion (126) of the screen image to generate a background (e.g., dark, black, etc.) object 128 to be rendered in the screen image with the change to the portion (126). The background object (128) may provide a background—as visually perceived by the viewer (112)—other than a default background such as transparency or semi-transparency background to the AR depicted object (120-1). In some operational scenarios, the background object (128) as visually perceived by the viewer (112) with the foreground object (120-1) may be co-extensive with or larger or smaller than the foreground object (120-1). In some operational scenarios, the background object (128) as visually perceived by the viewer (112) with the foreground object (120-1) may coincide or may not coincide with the foreground object (120-1) at the same depth to the viewer (112).

In some operational scenarios, similar compensated image rendering operations may be performed for some or all other foreground objects depicted in AR images to make localized changes or local adjustments in corresponding screen images to be rendered with the AR images concurrently, for the purpose of providing (e.g., local, localized, only change the background behind the foreground objects, etc.) backgrounds to the foreground objects depicted in the AR images.

In some operational scenarios, only a single object or a limited number of objects in the AR image may be compensated with background objects or background image portions rendered on the corresponding screen image. For example, the object (120-1) may be selected or identified based on information collected from eye tracking and device tracking. The collected information may be used to determine which of the objects is being focused, followed or tracked by the gaze of the viewer (112) at the time when the AR image and the corresponding screen image are to be rendered. Only the object gazed at by the viewer (112) may be compensated with background objects or background image portions rendered on the corresponding screen image. Additionally, optionally or alternatively, only the object gazed at by the viewer (112) and objects within a limited (e.g., 3 angular degree, 5 angular degree, 10 angular degree, etc.) vision field of the viewer (112) around the object gazed at by the viewer (112) may be compensated with background objects or background image portions rendered on the corresponding screen image.

Additionally, optionally or alternatively, other compensated image rendering in addition to or in place of background compensated image rendering may be implemented or performed under techniques as described herein.

In a first example, compensated image rendering may be implemented or performed to increase an effective or combined dynamic range of a combination of the AR image display (102) and the screen image display (104)). The peak luminance for one or more pixels (e.g., corresponding to a depicted object gazed at by the viewer (112), etc.) rendered in the AR image space (102) and/or the screen image space (104) can be increased by implementing or performing compensated image rendering to increase image rendering light levels/transmissions from the combination of the AR image display (102) and the screen image display (104)). Conversely, the darkest black for one or more pixels rendered in the AR image space (102) and/or the screen image space (104) can be lowered by implementing or performing compensated image rendering to decrease image rendering light levels/transmissions with the combination of the AR image display (102) and the screen image display (104)), for example according to artistic intent for a rendered overall image that includes the pixels. For instance, as a depicted object is being looked or gazed at by the viewer (112), image details of the depicted object may be rendered through compensated image rendering with the combination of the AR image display (102) and the screen image display (104)) using luminance/brightness levels up to the relatively high peak luminance and/or dark levels down to the darkest black.

In a second example, compensated image rendering may be implemented or performed to enlarge an effective or combined color gamut of a combination of the AR image display (102) and the screen image display (104)). Color saturation for one or more pixels (e.g., corresponding to a depicted object gazed at by the viewer (112), etc.) rendered in the AR image space (102) and/or the screen image space (104) can be increased by implementing or performing compensated image rendering to use relatively saturated color primaries from the combination of the AR image display (102) and the screen image display (104)). For instance, as a depicted object is being looked or gazed at by the viewer (112), image details of the depicted object may be rendered through compensated image rendering with the combination of the AR image display (102) and the screen image display (104)) using an enlarged color gamut.

In a third example, compensated image rendering may be implemented or performed to enhance an effective or combined color precision of a combination of the AR image display (102) and the screen image display (104)). Color precision for one or more pixels (e.g., corresponding to a depicted object gazed at by the viewer (112), etc.) rendered in the AR image space (102) and/or the screen image space (104) can be increased by implementing or performing compensated image rendering to use relatively precise colors with less quantization or coding errors from the combination of the AR image display (102) and the screen image display (104)). For instance, as a depicted object is being looked or gazed at by the viewer (112), image details of the depicted object may be rendered through compensated image rendering with the combination of the AR image display (102) and the screen image display (104)) at enhanced color precision.

In a fourth example, compensated image rendering may be implemented or performed to optimize an effective or combined spatial resolution of a combination of the AR image display (102) and the screen image display (104)). Spatial resolutions for one or more image details (e.g., corresponding to a depicted object gazed at by the viewer (112), etc.) rendered in the AR image space (102) and/or the screen image space (104) can be increased by implementing or performing compensated image rendering to use relatively high spatial resolution pixels with less pixilation or errors from the combination of the AR image display (102)

and the screen image display (104)). For instance, as a depicted object is being looked or gazed at from a different viewing perspective of the viewer (112), previously occluded image details may be disoccluded and rendered through compensated image rendering with the combination of the AR image display (102) and the screen image display (104)) at a relatively high or optimized spatial resolution to show the now disoccluded image details.

Under other approaches that do not implement techniques as described herein, the AR image display (102) may render AR objects with discontinuous dynamic ranges, different color gamuts, different color saturations, different color precisions, different spatial resolutions, etc. As a depicted object moves through boundaries separating or between the AR image space (196-1) and the screen image space (196-2), the same semantic object as represented in overall images may be depicted or rendered with sudden and visually noticeable changes or disruptions in peak luminance, dark level, color gamut or color range, color saturation, color precision, spatial resolutions, etc. As a result, the viewer (112) may not be able to perceive this object (120-1) as a real or physically solid object.

As noted, the image rendering controller (e.g., 110 of FIG. 1C, etc.) can use and access some or all of user tracking information, real-time or non-real-time AR and/or screen image display device configuration and/or operational information, received image data and/or image metadata to determine geometric information and/or geometric relationships in connection with a depicted object in the AR image space (196-1) and/or the screen image space (196-2).

Using some or all of the determined geometric information and/or geometric relationships in connection with the depicted object, the image rendering controller (110) can partition the depicted object represented in one or more overall images into corresponding mutually compensated image details in one or more AR images and one or more corresponding screen images, both of which AR and screen images are generated from the one or more overall images. 3D dimensionality of the depicted object may be implemented or rendered in one or both of the AR images and the screen images.

In some operational scenarios, both the rendering of the depicted object with the AR image display (102) and the rendering of the depicted object by the screen image display (104) may be time synchronized (e.g., within a time difference that the Human Visual System or HVS can temporarily resolved, etc.).

Additionally, optionally or alternatively, the depicted object rendered with the AR image display (102) and the depicted object rendered by the screen image display (104), as seen or visually perceived by the viewer (112), may be co-extensive. In some operational scenarios, the depicted object rendered with the AR image display (102) and the depicted object rendered by the screen image display (104), as seen or visually perceived by the viewer (112), may coincide or may not coincide with each other at the same depth to the viewer (112).

In some operational scenarios, only a single object or a limited number of objects in the AR images and/or the screen images may be compensated or cooperatively rendered with the combination of the AR image display (102) and the screen image display (104) as controlled by the image rendering controller (110). For example, such an object may be selected or identified based on information collected from eye tracking and device tracking. The collected information may be used to determine which of the objects is being focused, followed or tracked by the gaze of the viewer (112) at the time when the AR images and the corresponding screen images are to be rendered. Identifying one or more objects. i.e. a single object or a limited number of objects, comprises detecting edges of the identified one or more objects to separate background from the identified one or more objects. While the term "focus" refers to all objects located in an area of focus including background, the identified one or more objects concern a subset of the area of focus in which the background has been separated from the identified one or more objects. Only the object gazed at by the viewer (112) may be compensated and cooperatively rendered by the combination of the AR image display (102) and the screen image display (104) while other portions of the image related to background in the area of focus remain uncompensated. Additionally, optionally or alternatively, only the object gazed at by the viewer (112) and objects within a limited (e.g., 3 angular degree. 5 angular degree. 10 angular degree, etc.) vision field of the viewer (112) around the object gazed at by the viewer (112) may be compensated and cooperatively rendered by the combination of the AR image display (102) and the screen image display (104).

In some operational scenarios, the screen image display (104) may be implemented or configured with higher display capabilities than the AR image display (102). For example, the screen image display (104) may be capable of rendering higher dynamic range, larger color gamut, higher color precision, finer spatial resolution, etc., as compared with the AR image display (102). For example, the AR image display (102) may be a black-and-white image display or an LED (light emission diode) image display with smaller color gamut, lower dynamic range, lower spatial resolution, etc., whereas the screen image display (104) may be a laser color primary image display with larger color gamut, higher dynamic range, higher spatial resolution, etc. The screen image display (104) may be controlled or driven by the image rendering controller (110) to perform compensated image rendering to enhance depicted objects or image details rendered with the AR image display (102). For example, the image rendering controller (110) may modify, or add into, screen images with one or more compensated image portions for the depicted objects for the purpose of causing the screen image display (104) to compensate for the depicted objects in one or more visual characteristics such as one or more of dynamic range, color gamut, spatial resolution, color saturation, color precision, etc.

Additionally, optionally or alternatively, even if the screen image display (104) may be implemented or configured with lower or comparable display capabilities as compared with the AR image display (102), the screen image display (104) may still be controlled or driven by the image rendering controller (110) to perform compensated image rendering to enhance depicted objects or image details rendered with the AR image display (102), albeit to a relatively limited extent. For example, the image rendering controller (110) may still modify, or add into, screen images with one or more compensated image portions for the depicted objects for the purpose of causing the screen image display (104) to compensate for the depicted objects in one or more visual characteristics such as one or more of dynamic range, color gamut, spatial resolution, color saturation, color precision, etc.

Additionally, optionally or alternatively, in some operational scenarios, the AR image display (102) may be implemented or configured with higher display capabilities than the screen image display (104). For example, the AR image display (102) may be capable of rendering higher dynamic range, larger color gamut, higher color precision, finer spatial resolution, etc., as compared with the screen image display (104). The AR image display (102) may be controlled or driven by the image rendering controller (110) to perform compensated image rendering to enhance depicted objects or image details rendered with the screen image display (104). For example, the image rendering controller (110) may modify, or add into, AR images with one or more compensated image portions for the depicted objects for the purpose of causing the AR image display (102) to compensate for the depicted objects in one or more visual characteristics such as one or more of dynamic range, color gamut, spatial resolution, color saturation, color precision, etc.

Additionally, optionally or alternatively, even if the AR image display (102) may be implemented or configured with lower or comparable display capabilities as compared with the screen image display (104), the AR image display (102) may still be controlled or driven by the image rendering controller (110) to perform compensated image rendering to enhance depicted objects or image details rendered with the screen image display (104), albeit to a relatively limited extent. For example, the image rendering controller (110) may still modify, or add into, AR images with one or more compensated image portions for the depicted objects for the purpose of causing the AR image display (102) to compensate for the depicted objects in one or more visual characteristics such as one or more of dynamic range, color gamut, spatial resolution, color saturation, color precision, etc.

Brain processes performed by the HVS may blend, mix or integrate AR and screen visual information or image rendering light generated from compensated image rendering for the depicted objects. Hence, even if the AR image display (102) renders the depicted objects as black-and-white, color or chroma information rendered from the screen image display (104) may be used by the brain processes to allow the HVS such as the viewer (112) to perceive the overall depicted objects as colored objects.

Additionally, compensated image rendering can be performed using any of one or more different color spaces such as YCbCr, RGB, etc., to achieve optimized or best possible image rendering qualities using the combination of the AR image display (102) and the screen image display (104). In an example, AR images may be represented in the same color space (e.g., YCbCr, RGB, etc.) as screen images. In another example, AR images may be represented in a different color space (e.g., one of YCbCr and RGB, etc.) from a color space (the other of YCbCr and RGB in the present example) in which screen images are represented. For instance, compensated image rendering may be performed based on modified pixel values in a single color component/channel (e.g., luma, chroma, red, green, blue, etc.) or based on modified pixels values in multiple different color components/channels.

5. Dynamic Image Rendering Transition Between Image Displays

Compensated image rendering can be performed by the AR image display (102) and the screen image display (104) dynamically and cooperatively in a time-varying manner for 3D objects that are spatially moving.

Figure 3B:
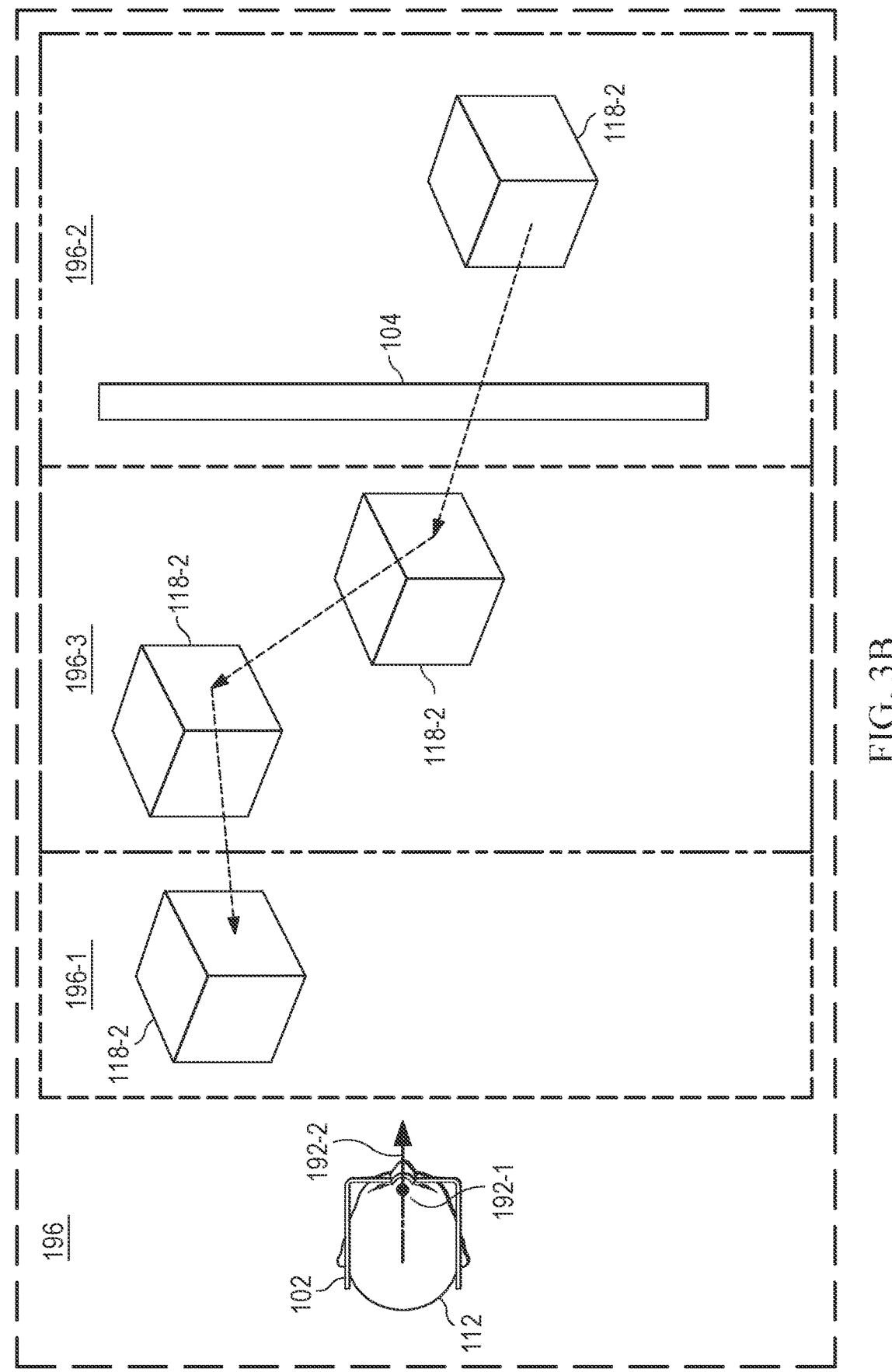

FIG. 3B illustrates example compensated image rendering for moving 3D objects (e.g., 118-2). The screen image display (104) may be configured or controlled by the image rendering controller (110) to render 3D objects within the screen image space (196-2). The AR image display (102) may be configured or controlled by the image rendering controller (110) to render 3D objects within the AR image space (196-1). As shown, the screen image space (196-2) partially overlaps with the AR image space (196-1). In this partially overlapped image subspace (196-3) between the screen image space (196-2) and the AR image space (196-1), 3D objects can be rendered or depicted by both the AR image display (102) and the screen image display (104). The partially overlapped image subspace (196-3) may be pre-fixed or dynamically adaptable by the image rendering controller (110). Additionally, optionally or alternatively, partially overlapped image subspace (196-3) may be individually defined, determined or set up by the image rendering controller (110) for individual 3D objects using a number of determination factors including but not limited to individual directions and magnitudes of velocities of the 3D objects, individual sizes of the 3D objects, whether any of these 3D objects is being gazed at by the viewer (110), etc. For the purpose of illustration only, the partially overlapped image subspace (196-3) is depicted as before the screen image display (104) in reference to the viewer (112). It should be noted that, in various embodiments, a partially overlapped image subspace as described herein may or may not be depicted as before the screen image display (104).

As indicated by the starting point of a sequence of broken arrows in FIG. 3B, the 3D object (118-2) may be depicted or rendered in first screen images as initially at a first time point at a first spatial position. For the purpose of illustration only, the first spatial position is depicted as behind the screen image display (104) in reference to the viewer (112). As the first spatial position is outside the partially overlapped image subspace (196-3) and entirely within the screen image space (196-2), the 3D object (118-2) is depicted or rendered with the first screen images at the first time point. All the user-perceived visual characteristics—luminance, chrominance, saturation, hue, RGB, spatial resolution, image details, image refresh rate, etc.—of the 3D object (118-2) at the first spatial position are conveyed or generated by way of the first screen images rendered by the screen image display (104).

Subsequently, the 3D object (118-2) may gradually or continuously move to a second spatial position at a second time point, thereby entering the partially overlapped image subspace (196-3) between the AR image space (196-1) and the screen image space (196-2). As shown in FIG. 3B, the second spatial position is indicated by the end point to which the first arrow in the sequence of broken arrows points. As the second spatial position is within the partially overlapped image subspace (196-3), the 3D object (118-2) is depicted or rendered collectively and collaboratively in first AR images generated with the AR image display (102) and in second screen images generated with the screen image display (104). The AR image display (102) and the screen image display (104) can be configured and controlled by the image rendering controller (110) to perform compensated image rendering to generate and convey all the user-perceived visual characteristics—luminance, chrominance, saturation, hue, RGB, spatial resolution, image details, image refresh rate, etc.—of the 3D object (118-2) at the second spatial position.

As indicated by the sequence of broken arrows in FIG. 3B, the 3D object (118-2) may keep moving to a third spatial position at a third time point, thereby reaching near the end of the partially overlapped image subspace (196-3). The third spatial position is indicated by the end point to which the second arrow in the sequence of broken arrows points. As the second spatial position remains within the partially overlapped image subspace (196-3), the 3D object (118-2) is continually depicted or rendered collectively and collaboratively in the first AR images generated with the AR image display (102) and in the second screen images generated with the screen image display (104). As at the second spatial position, the AR image display (102) and the screen image display (104) can be configured and controlled by the image rendering controller (110) to continually perform compensated image rendering to generate and convey all the user-perceived visual characteristics—luminance, chrominance, saturation, hue, RGB, spatial resolution, image details, image refresh rate, etc.—of the 3D object (118-2) at the third spatial position.

Finally, as indicated by the ending point of the sequence of broken arrows in FIG. 3B, the 3D object (118-2) may keep moving to a fourth spatial position at a fourth time point, thereby exiting the partially overlapped image subspace (196-3) and entering into a non-overlapping image subspace—which is relatively close to the viewer (112)—of the AR image space (196-1). As the fourth spatial position is outside the partially overlapped image subspace (196-3) and entirely within the AR image space (196-1), the 3D object (118-2) is depicted or rendered with the second AR images at the fourth time point. All the user-perceived visual characteristics—luminance, chrominance, saturation, hue, RGB, spatial resolution, image details, image refresh rate, etc.—of the 3D object (118-2) at the fourth spatial position are conveyed or generated by way of the second AR images rendered by the AR image display (102).

In a spatial trajectory formed by the motions of the 3D object (118-2), the rendering of the 3D object (118-2) in the overall image space formed by the AR image space (196-1) and the screen image space (196-2) is gradually being handed off from one image display (or the screen image display (104) in the present example) to a different image display (or the AR image display (102) in the present example) in a soft manner. For example, in the partially overlapped image subspace (196-3), both the AR image display (102) and the screen image display (104) may separately and concurrently render the same object such as the 3D object (118-2) in their respective AR and/or screen images. The separately rendered object in the respective AR and/or screen images can be integrated by the HVS or the viewer (112) into a single unified rendered object with smoothly transitioned visual characteristics.

In response to determining that the depicted object is at a spatial position closer to the non-overlapped image subspace of the AR image space (196-1), AR contributions to these visual characteristics from the AR images may be set by the image rendering controller (110) to a relatively large weight factor value, while screen contributions to these visual characteristics from the screen images may be set by the image rendering controller (110) to a relatively small weight factor value.

Conversely, in response to determining that the depicted object is at a spatial position closer to the non-overlapped image subspace of the screen image space (196-2), AR contributions to these visual characteristics from the AR images may be set by the image rendering controller (110) to a relatively small weight factor value, while screen contributions to these visual characteristics from the screen images may be set by the image rendering controller (110) to a relatively large weight factor value.

Under compensated image rendering techniques as described herein, as the 3D object (118-2) moves along its spatial trajectory, the user-perceived visual characteristics—luminance, chrominance, saturation, hue, RGB, spatial resolution, image details, image refresh rate, etc.—of the 3D object (118-2) can be conveyed or generated by the AR image display (102) and/or the screen image display (104) continuously and smoothly without visually noticeable disruptions or discontinuities in these user perceived visual characteristics. In an example, as the 3D object (118-2) such as a deer moves toward the viewer (118-2), the 3D object (118-2) may be rendered as becoming a brighter and brighter object. Luminance/brightness levels of the 3D object (118-2) can be conveyed or generated by the AR image display (102) and/or the screen image display (104) as continuously and smoothly increasing without visually noticeable disruptions or discontinuities in these user perceived visual characteristics. In another example, as the 3D object (118-2) or the deer moves toward the viewer (118-2), the 3D object (118-2) may be rendered with more and more image details at gradually increasing spatial resolutions. Spatial resolutions or image details of the 3D object (118-2) can be conveyed or generated by the AR image display (102) and/or the screen image display (104) as continuously and smoothly increasing without visually noticeable disruptions or discontinuities in these user perceived visual characteristics. As a result, even though the AR image display (102) and the screen image display (104) may render the AR and screen images depicting 3D objects in the respective AR and screen image spaces (196-1 and 196-2), the viewer (112) visually perceive these 3D objects as if being continuously and smoothly rendered by a single unified image display in a single unified image space without visual artifacts, disruptions or discontinuities.

6. Supplemental Information Display

As illustrated in FIG. 1B and FIG. 3B, in some operational scenarios, the AR image space (196-1) may be an image space at least partly in front of the screen image space (196-2) in reference to the viewer (112). In some operational scenarios, the AR image space (196-1) may form different spatial relationships with the screen image space (196-2) in reference to the viewer (112). Additionally, optionally or alternatively, the AR image space (196-1) may be partitioned into different AR image subspaces in which different types of compensated image rendering may be performed.

Figure 3C:
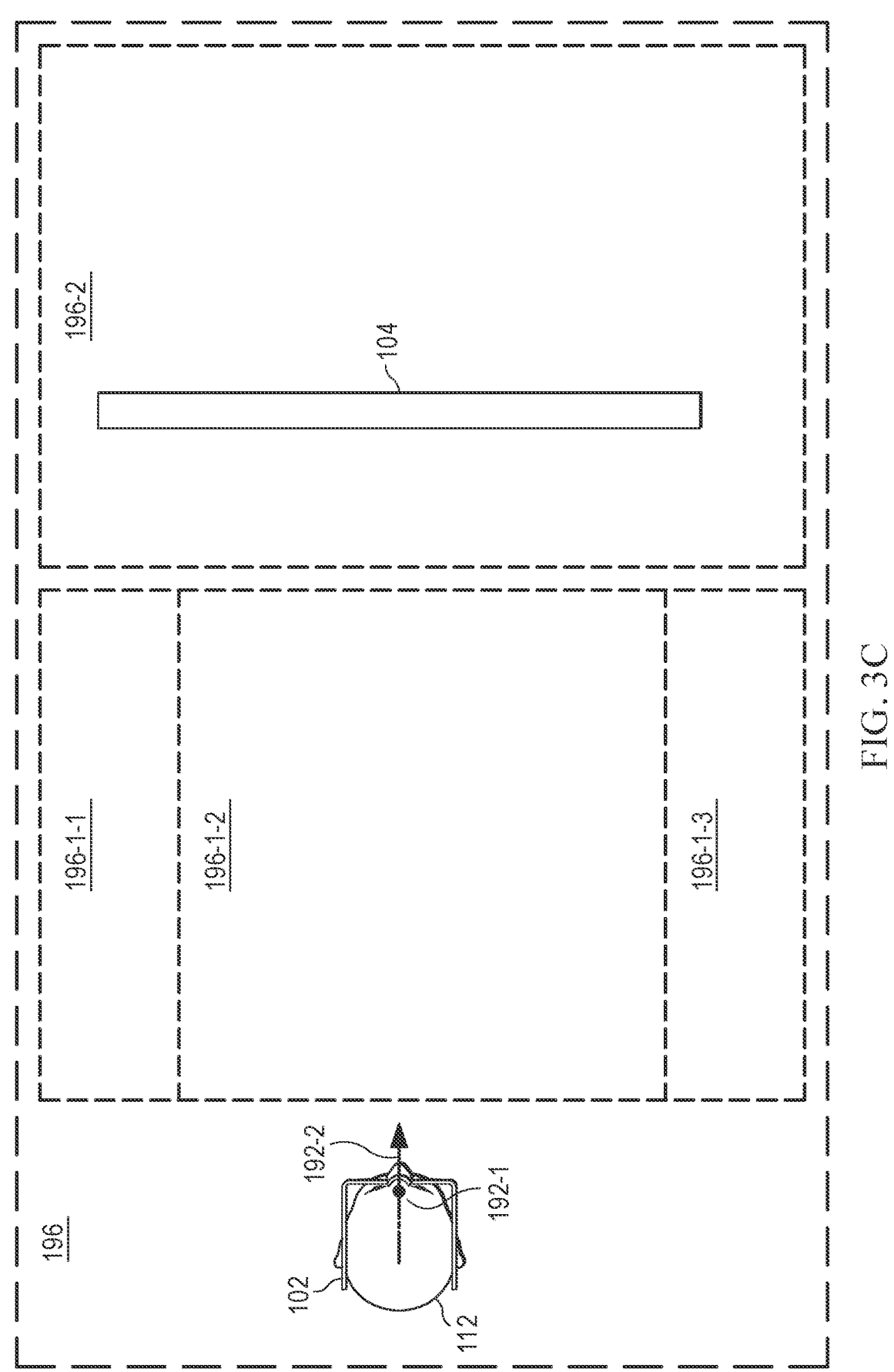

FIG. 3C illustrates example image subspaces in which different types of compensated image rendering may be performed between the AR image display (102) and the screen image display (104), for example in an interactive image/video display application such as computer (video) gaming. As shown, the AR image space (196-1) are split or partitioned into AR image subspaces 196-1-1, 196-1-2 and 196-1-3.

The AR image subspaces (196-1-1 and 196-1-3) may be used by the AR image display (102) to act as a head-up display (HUD) in this application. The viewer may be a game player that focuses on game activities in visual scenes rendered on the screen image display (104) in the screen image space (196-2). The visual scenes rendered in the screen image space (196-2) by the screen image display (104) may include 2D or 3D objects that can be viewed by the viewer (112) through the AR image subspace (196-1-2) with or without 3D glasses.

While the viewer (112) is playing or focusing on the video game, the AR image subspace (196-1-2) can be used by the AR image display (102) to perform a first type of compensated image rendering that embellishes or enhances visual characteristics of the 2D or 3D objects rendered by the screen image display (104). Additionally, optionally or alternatively, while the viewer (112) is playing or focusing on the video game, the AR image display (102) may not directly perform compensated image rendering to embellish or enhance visual characteristics of the 2D or 3D objects rendered by the screen image display (104).

In some operational scenarios, while the viewer (112) is playing or focusing on the video game, the AR image subspaces (196-1-1 and 196-1-3) can be used by the AR image display (102) to act as a head-up display (HUD) to display 2D or 3D objects such as supplemental game information. The supplemental game information including but not limited o available ammos, other players' messages, etc., may be presented or rendered in the AR image subspaces (196-1-1 and 196-1-3) by the AR image display (102) without disturbing, occlude, obstructing or obfuscating the visual scenes or the main game area (or relatively critical region of interest) rendered by the screen image display in the screen image space (196-2). Some or all of the supplemental game information may be collected or generated by a game device operating with the screen image display (104), received by or pushed to the image rendering controller (110) by the game device, and used by the image rendering controller (110) to generate or modify corresponding AR images to be concurrently rendered with the AR image display (102) in the AR image subspaces (196-1-1 and 196-1-3). As a result, some or all of the supplemental game information may be from being displayed or rendered by the screen image display (104) to clutter the visual scenes depicting the ongoing game activities in the screen image space (196-2).

Additionally, optionally or alternatively, non-game information may be collected or generated by a computing device operating with the screen image display (104), received by or pushed to the image rendering controller (110) by the computing device, and used by the image rendering controller (110) to generate or modify corresponding AR images to be concurrently rendered with the AR image display (102) in the AR image spaces (196-1) along with the screen images rendered by the screen image display (104).

The AR image display (102) may be a part of a user device that is configured with eye tracking capabilities to track, at a plurality of (consecutive) time points over a time interval or a user session with relatively low latency, (e.g., real-time, near real-time, within a strict time latency budget, etc.) gazes or viewing directions of the viewer (112), for example in addition to or in place of device tracking of the spatial position (192-1) and direction (192-2) of the AR image display (102) or 3D glasses.

Eye tracking information that indicates the (e.g., real-time, near real-time, within a strict time latency budget, etc.) gaze or viewing direction of the viewer (112)—as generated or collected by the user device that includes or operates with the AR image display (102)—may be used to modify screen images to be rendered by the screen image display (104).

For example, one or more screen image portions corresponding to the (e.g., real-time, near real-time, within a strict time latency budget, etc.) foveal or focus vision field portion of the viewer (112) in the screen images may be streamed with relatively high quality video/image data and rendered on the screen image display (104) with relatively high dynamic range, relatively wide color gamut, relatively high spatial resolution, relatively high saturation, relatively accurate color precision, etc.

At the same time, non-foveal-vision image portions corresponding to the (e.g., real-time, near real-time, within a strict time latency budget, etc.) non-foveal or non-focus vision field portions of the viewer (112) in the screen images may be streamed with relatively low quality video/image data and rendered on the screen image display (104) with relatively low dynamic range, relatively narrow color gamut, relatively low spatial resolution, relatively low saturation, relatively inaccurate color precision, etc.

Example eye tracking and foveal vision image rendering can be found in U.S. Provisional Patent Application No. 62/699,583, with an application title of "FOVIATION AND HDR" by Ajit Ninan, filed on 17 Jul. 2018, the entire contents of which are hereby incorporated by reference as if fully set forth herein.

Additionally, optionally or alternatively, non-eye-tracking information may be collected or generated by a computing device operating with the AR image display (102), received by or pushed to the image rendering controller (110) by the computing device, and used by the image rendering controller (110) to generate or modify corresponding screen images to be concurrently rendered with the screen image display (104) in the screen image spaces (196-2).

7. Example Image Rendering System

FIG. 1C illustrates an example media system 100 that includes an image rendering controller 110, a screen image renderer 106, an AR image renderer 108, an AR image display 102, a screen display 104, a device tracker 122, a tracking sensor assembly 124, etc. Some or all of the components/devices as depicted in FIG. 1C may be implemented by one or more mechanical components, one or more electrooptical components, one or more computing devices, modules, units, etc., in software, hardware, a combination of software and hardware, etc. Some or all of the components/devices as depicted in FIG. 1C may be communicatively (e.g., wirelessly, with wired connections, etc.) coupled with some other components/devices as depicted in FIG. 1C or with other components/devices not depicted in FIG. 1C.

In some embodiments, the device tracker (122) operates in conjunction with the tracking sensor assembly (124) to monitor, at a plurality of (consecutive) time points over a time interval or a user session with relatively low latency, spatial positions and directions of the AR image display (102) or 3D glasses used by the viewer (112) to view screen images rendered on the screen image display (104).

Image content 114 may be received, composed or generated by the image rendering controller (110). In some operational scenarios, the image content (114) may comprise or represent a sequence of (e.g., consecutive, overall, input, original, streamed, etc.) images that are to be partitioned into a corresponding sequence of (consecutive) AR images and/or a corresponding sequence of (consecutive) screen images.

The image rendering controller (110) uses the image content (114) to generate screen images to be provided or streamed to the screen image display (104) for rendering. Additionally, optionally or alternatively, the image rendering controller (110) uses the image content (114) to generate AR images to be provided or streamed to the AR image display (102) for rendering.

The screen display images may represent 2D images, or 3D/stereoscopic images comprising left view images and right view images. Likewise, the AR display images may represent 2D images, or 3D/stereoscopic images comprising left view images and right view images.

The image rendering controller (110) receives, from the device tracker (122), device tracking information indicating spatial positions (e.g., 192-1, etc.) and spatial directions (e.g., 192-2, etc.) of the AR image display (102) or 3D glasses over time (e.g., over a time interval, over the entire time duration of a 3D movie, etc.). Additionally, optionally or alternatively, some or all of the tracking information or the spatial positions (e.g., 192-1, etc.) and spatial directions (e.g., 192-2, etc.) of the AR image display (102) or 3D glasses over time can be sent by the device tracker (122) or the image rendering controller (110) to one or both of (a) a user device that includes the AR image renderer (108) and the AR image display (102) and (b) a computing device that includes the screen image renderer (106) and the screen image display (104). Additionally, optionally or alternatively, eye tracking information indicating gazes or viewing directions of eyes of the viewer (112) over time can be collected and sent by a user device that includes the AR image renderer (108) and the AR image display (102) to the image rendering controller (110) or to a computing device that includes the screen image renderer (106) and the screen image display (104).

Based at least in part on the spatial positions and spatial directions of the AR image display (102) or 3D glasses, the image rendering controller (110) or the AR image renderer (108) can determine spatial relationships between the AR image display (102) (or 3D glasses) and the screen image display (104), and use the spatial relationships to modify or adjust the AR images to be rendered by the AR image display (102). Additionally, optionally or alternatively, based at least in part on the spatial positions and spatial directions of the AR image display (102) or 3D glasses, the image rendering controller (110) or the screen image renderer (106) can determine spatial relationships between the AR image display (102) (or 3D glasses) and the screen image display (104), and use the spatial relationships to modify or adjust the screen images to be rendered by the screen image display (104). Additionally, optionally or alternatively, based at least in part on the viewing directions of the viewer (112), the image rendering controller (110) or the screen image renderer (106) can modify or adjust the screen images to be rendered by the screen image display (104) to increase rendering qualities in image portions corresponding to foveal vision field portions of the viewer (112).

Examples of the screen image display (104) may be an image display in a cinema, an image display in a home entertainment system, etc. The screen display (104) may be stationary in a 3D physical space.

In some embodiments, the AR image display (102) may be not a physical display but rather a virtual image display created by light rays emitted by imager(s) in the AR image display (102).

The media system (100) may be used to support real time video applications, near-real-time video applications, non-real-time video applications, virtual reality (VR) applications, augmented reality (AR) applications, remote presence applications, automobile entertainment applications, helmet mounted display applications, heads up display applications, games, 2D display applications, 3D display applications, multi-view display applications, etc. For example, some or all of input image content (114) can be generated or accessed by the image rendering controller (110) in real time, in near real time, in non-real time, etc.

8. Example Process Flows

Figure 4:
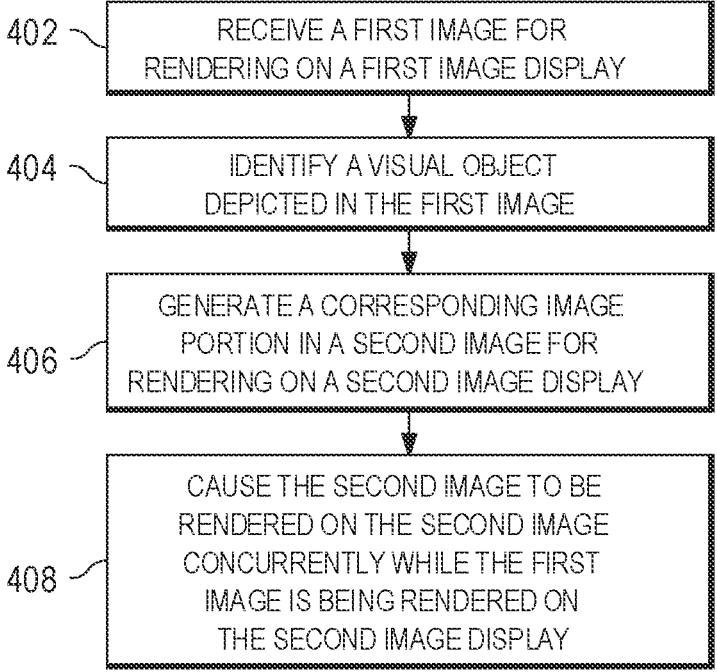
FIG. 4 illustrates example process flows.

FIG. 4 illustrates an example process flow. In some example embodiments, one or more computing devices or components may perform this process flow. In block 402, an image rendering system (e.g., an image rendering controller, a user device that includes a non-stationary image display such as an AR image display, a wearable device, a PC with a screen image display, a laptop computer with a screen image display, etc.) receives a first image for rendering on a first image display in a combination of a stationary image display and a non-stationary image display.

As used herein, a stationary image display may refer to one of: an external screen image display that is external to a user device coupled or attached to the user, an external screen image display that is external to a user device rendering images without physical screen, a portable or affixed image display with a physical screen, an image display relatively stationary in relation or with reference to a 3D physical space, an image display relatively static and unaffected by head or body motions of a viewer, a more stationary image display among two or more image displays, etc. A non-stationary image display may refer to one of: an internal screen image display that is internal to or a part of a user device coupled or attached to the user, an image display without physical screen, a movable image display without a physical screen, an image display relatively non-stationary in relation or with reference to a 3D physical space, an image display relatively dynamic and readily affected by head or body motions of a viewer, a less stationary image display among two or more image displays, etc.

In block 404, the image rendering system identifies a visual object depicted in the first image.

In block 406, the image rendering system generates a corresponding image portion in a second image for rendering on a second image display in the combination of the stationary image display and the non-stationary image display. The corresponding image portion in the second image as rendered on the second image display overlaps in a vision field of a viewer with the visual object depicted in the second image as rendered on the first image display to modify one or more visual characteristics of the visual object.

In block 408, the image rendering system causes the second image to be rendered on the second image concurrently while the first image is being rendered on the second image display.

In an embodiment, the stationary image display represents a screen image display stationary in a physical 3D space in which the stationary image display and the non-stationary image display reside.

In an embodiment, the non-stationary image display is included in a user coupled device of the viewer.

In an embodiment, a gaze of the viewer is tracked in real time: the gaze of the viewer is used to identify the visual object in the first image.

In an embodiment, a viewing direction of a user device that includes the non-stationary image display is tracked in real time: the viewing direction of the user device is used to perform perspective correction adjustments on at least one of the first image or the second image.

In an embodiment, the viewing direction of the viewer is represented by one or both of a spatial position of the user device or a spatial direction of the user device.

In an embodiment, the first image represents a stereoscopic image: the first image depicts one or more 3D images that include the visual object: the viewer visually perceives the one or more 3D objects depicted in the first image through a 3D viewing device.

In an embodiment, the one or more visual characteristics include at least one of: dynamic range, peak luminance, a darkest black level, an object background, color saturation, or another visually perceived characteristics.

In an embodiment, the first and second images relate to one of: an augmented reality application, a virtual reality application, a mixed reality application, a computer game application, an interactive video application, a non-interactive video application, etc.

In an embodiment, an overall image space in which the first image display and the second image display renders visual objects is partitioned into a first image subspace, a second image subspace and a third image subspace: a specific visual characteristic of any visual object in the first image subspace is completely rendered by the first image display: the specific visual characteristic of any visual object in the second image subspace is jointly rendered by the first image display and the second image display: the specific visual characteristic of any visual object in the third image subspace is completely rendered by the second image display.

In an embodiment, the first image display is the stationary image display: the visual object is a part of a main visual scene depicted in a sequence of images rendered on the stationary image display: supplemental information is rendered by the non-stationary image display in image space portions that are free from obstructing the main visual scene depicted in the sequence of images rendered on the stationary image display.

In an embodiment, eye tracking information is collected with a user device that includes the non-stationary image display: a gaze of the viewer as derived from the eye tracking information is used to render, on the stationary image display, one or more relatively high quality image portions corresponding to a foveal vision field portion of the viewer and other relatively low quality image portions not corresponding to the foveal vision field portion.

In an embodiment, a display system comprises: a non-stationary image display that renders non-screen display images: a stationary image display that renders screen display images: an image rendering controller that performs at least a part of the foregoing methods or operations.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
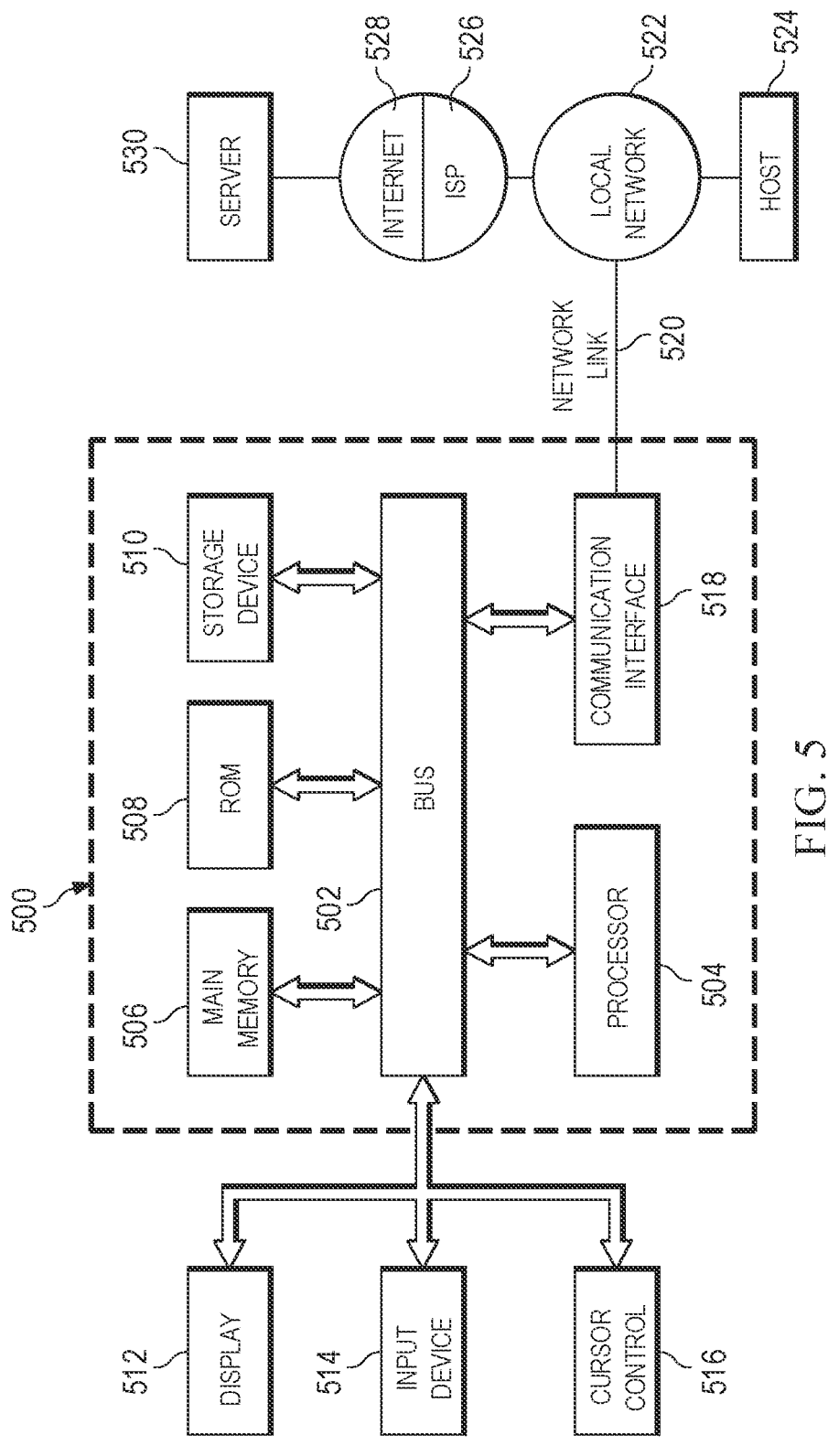
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:

receiving a first image for rendering on a first image display in a combination of a stationary image display and a non-stationary image display;

tracking a gaze of a viewer in real time by tracking a viewing direction of a user device that includes the non-stationary image display;

identifying a visual object depicted in the first image by analyzing the tracked viewing direction to determine the visual object gazed at by the viewer, wherein identifying the visual object comprises detecting edges of the visual object to separate background from the visual object;

generating a corresponding image portion in a second image depicting only the identified visual object for rendering on a second image display in the combination of the stationary image display and the non-stationary image display, wherein the first image display and the second image display respectively represent the stationary image display and the non-stationary image display, wherein the corresponding image portion in the second image as rendered on the second image display overlaps in a vision field of a viewer with the visual object depicted in the second image as rendered on the first image display to perform compensated image rendering for enhancing only the identified visual object in one or more visual characteristics such as one or more of dynamic range, color gamut, spatial resolution, color saturation and color precision;

performing perspective correction on the second image based on a change of one or both of a spatial position and a spatial direction of the non-stationary image display;

causing the second image generated with the perspective correction to be rendered on the second image display concurrently while the first image is being rendered on the first image display.

2. The method of claim 1, wherein the stationary image display represents a screen image display stationary in a physical 3D space in which the stationary image display and the non-stationary image display reside.

3. The method of claim 1, wherein the non-stationary image display is included in a user coupled device of the viewer.

4. The method of claim 1, wherein the viewing direction of the user device is used to perform perspective correction adjustments on at least one of the first image or the second image.

5. The method of claim 1, wherein the viewing direction of the viewer is represented by one or both of a spatial position of the user device or a spatial direction of the user device.

6. The method of claim 1, wherein the first image represents a stereoscopic image; wherein the first image depicts one or more 3D images that include the visual object; wherein the viewer visually perceives the one or more 3D objects depicted in the first image through a 3D viewing device.

7. The method of claim 1, wherein the first and second images relate to one of: an augmented reality application, a virtual reality application, a mixed reality application, a computer game application, an interactive video application, or a non-interactive video application.

8. The method of claim 1, wherein an overall image space in which the first image display and the second image display renders visual objects is partitioned into a first image subspace, a second image subspace and a third image subspace; wherein a specific visual characteristic of any visual object in the first image subspace is completely rendered by the first image display; wherein the specific visual characteristic of any visual object in the second image subspace is jointly rendered by the first image display and the second image display; wherein the specific visual characteristic of any visual object in the third image subspace is completely rendered by the second image display.

9. The method of claim 1, wherein the first image display is the stationary image display; wherein the visual object is a part of a main visual scene depicted in a sequence of images rendered on the stationary image display; wherein supplemental information is rendered by the non-stationary image display in image space portions that are free from obstructing the main visual scene depicted in the sequence of images rendered on the stationary image display.

10. The method of claim 1, wherein the gaze of the viewer is used to render, on the stationary image display, one or more relatively high quality image portions corresponding to a foveal vision field portion of the viewer and other relatively low quality image portions not corresponding to the foveal vision field portion.

11. A display system, comprising:

a non-stationary image display that renders non-screen display images;

a stationary image display that renders screen display images;

an image rendering controller that performs the method as recited in claim 1.

12. A non-transitory computer readable storage medium, storing software instructions, which when executed by one or more computer processors cause performance of the method recited in claim 1.

13. An apparatus comprising one or more computer processors and one or more storage media storing a set of instructions which, when executed by the one or more computer processors, cause performance of the method recited in claim 1.

* * * * *